United States Patent
Kang et al.

(10) Patent No.: US 7,224,694 B2
(45) Date of Patent: May 29, 2007

(54) APPARATUS FOR AND METHOD OF GENERATING POINTERS FOR TRANSFER OF STRUCTURED DATA IN AAL1

(75) Inventors: Ho Yong Kang, Daejon (KR); Je Soo Ko, Daejon (KR); Tae Whan Yoo, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1043 days.

(21) Appl. No.: 10/251,129

(22) Filed: Sep. 20, 2002

(65) Prior Publication Data

US 2004/0008686 A1    Jan. 15, 2004

(30) Foreign Application Priority Data

Jul. 12, 2002    (KR) ............................... 2002-40543

(51) Int. Cl.
    *H04L 12/28* (2006.01)
(52) U.S. Cl. .................................. 370/395.6
(58) Field of Classification Search .................... None
    See application file for complete search history.

(56) References Cited

U.S. PATENT DOCUMENTS 5,719,864 A * 2/1998 Badger et al. ........... 370/395.3
5,758,089 A * 5/1998 Gentry et al. ................. 709/234

(Continued)

FOREIGN PATENT DOCUMENTS

KR        10-185861        7/1998

OTHER PUBLICATIONS

Voice over ATM; An evaluation of Network Architecture Alternatives; by D. Wright IEEE Network Sep./Oct. 1996.

(Continued)

*Primary Examiner*—Huy D. Vu
*Assistant Examiner*—Blanche Wong
(74) *Attorney, Agent, or Firm*—Blakely Sokoloff Taylor & Zafman

(57) ABSTRACT

An apparatus for and a method of generating pointers for identifying structure boundaries of data for leased lines such as T1/E1 in an asynchronous transfer mode (ATM) adaptation layer Type 1 (AAL1) through an ATM layer. The apparatus includes a control signal generating unit for receiving a sequence number signal and a start signal, thereby generating enable signals and control signals, a next-cycle boundary generating unit for generating a next-cycle boundary value, using a pointer value and a "Pointer_P" value adapted to store a sequence of ATM cells, a modulo calculating unit for calculating a modulo obtained by dividing the next-cycle boundary value received from the next-cycle boundary generating unit by an externally-received block size value, a current-cycle boundary generating unit for generating a current-cycle boundary value, using the next-cycle boundary value received from the next-cycle boundary generating unit, the modulo received from the modulo calculating unit, and the block size value; and the pointer calculating unit for generating a pointer value for determination of structure boundaries and a "Pointer_P" value, to be supplied to the next-cycle boundary generating unit, based on the current-cycle boundary value received from the current-cycle boundary generating unit.

13 Claims, 5 Drawing Sheets

U.S. PATENT DOCUMENTS 5,768,274 A * 6/1998 Murakami et al. ........ 370/395.7
5,848,067 A * 12/1998 Osawa et al. .......... 370/395.61
5,978,377 A * 11/1999 Kim et al. ............. 370/395.71
6,151,325 A * 11/2000 Hluchyj ....................... 370/398
6,178,184 B1    1/2001 Petty
6,577,632 B2 * 6/2003 Hara et al. ............... 370/395.1
2002/0048260 A1 * 4/2002 Iidaka ....................... 370/242

OTHER PUBLICATIONS

Voice over ATM: An evaluation of implementation Alternatives by D. Wright IEEE Network May 1996.

* cited by examiner

APPARATUS FOR AND METHOD OF GENERATING POINTERS FOR TRANSFER OF STRUCTURED DATA IN AAL1

BACKGROUND OF THE INVENTION

1. Field of the Invention

The present invention relates to an apparatus for and a method of generating pointers for identifying structure boundaries of data for leased lines such as T1/E1 in an asynchronous transfer mode (ATM) adaptation layer Type 1 (AAL1) through an ATM layer. In particular, the present invention relates to an apparatus for and a method of generating pointers in an AAL1 for converting structured user data of narrowband-integrated service digital network (N-ISDN) and N×64 Kbps services in a broadband access subscriber network.

2. Description of the Related Art

Generally, an ATM adaptation layer (AAL) serves to perform functions for adapting services provided by an ATM layer to the request of the user of a higher layer.

The matching of both the higher layer and the ATM layer with the AAL is enabled through service access points between the convergence sublayer (CS) of the AAL and the higher layer and between the segmentation and reassembly sublayer (SAR) of the AAL and the ATM layer, respectively.

The AAL conducts mapping of the protocol data unit (PDU) of the higher layer with the payload slot of an ATM cell while processing transfer errors, and providing functions for performing processing for lost cells and inserted cells, flow control, and timing control. The AAL includes two sublayers, that is, the CS and the SAR.

The CS performs functions associated with specific services, whereas the SAR performs functions having no relation with completion of services, that is, functions associated with segmentation and reassembly of user information. At the transmission end, the CS receives user information from an upper layer, affixes a header to the user information to form a CS-PDU, and sends the CS-PDU to the SAR. The SAR cuts the CS-PDU to have an ATM cell size, affixes a header to the resultant CS-PDU to form an SAR-PDU, and transfers the SAR-PDU to the ATM layer. The headers affixed to the information passing through respective sublayers during the transfer procedure are associated with processing of errors, management of buffers, and keeping of sequences.

ITU-T, the telecommunication standardization sector of the International Telecommunications Union (ITU), established an ATM service standard for constant bit rate (CBR), real time, and connection, that is, Recommendation I363.1, in August, 1996. The ATM Forum established a circuit emulation service (CES) standard, that is, Recommendation af-vtoa-0078-000, in January, 1997. Services for users supported by the AAL1 include CBR data transfer services, timing information transfer services, user data structure information transfer services, error recovery services, cell delay variation processing services, and services for processing loss of cells and erroneous insertion of cells.

One conventional technique associated with generation of pointers for structured data in the AAL1 is a technique "APPARATUS FOR AND METHOD OF GENERATING POINTERS FOR TRANSFER OF STRUCTURED DATA IN AAL1" disclosed in Korean Patent No. 10-0185861 (Dec. 28, 1998) registered in the name of Daewoo Electronic Company, Ltd. This technique has proposed a pointer generating apparatus which includes a counter for counting user data to calculate the offset field of a pointer, a first register for outputting a count bit value corresponding to double the counted value from the counter, a second register for outputting a count bit value corresponding to a value obtained by adding "1" to the double value of the counted value from the counter, a multiplexer, other control circuits, and buffers. In accordance with this technique, however, the higher layer cannot support multiframe E1 or T1 time division multiplexing (TDM) trunks, in particular, N-ISDN channels. Also, when two or more ATM cells are generated for each N-ISDN channel, it is impossible to generate pointers for a plurality of virtual channels (VCs). Furthermore, there is a problem in that the pointer adapted to indicate the structure boundary of structured user data has a degraded accuracy.

Conventional AAL1 devices mainly use an unstructured data transfer mode to transfer data for leased lines such as T1/E1. Such leased lines, for example, T1/E1, form a 64-Kbps DS0 time slot based on a voice channel into an 8-Khz frame. Accordingly, one frame for the T1 consists of 24 time slots, whereas one frame for the E1 consists of 32 time slots. One extended super frame (ESF) for the T1 consists of 24 frames. One multiframe for the E1 consists of 16 frames.

The above mentioned conventional technique has proposed a configuration including elements having only the functions capable of designing an apparatus for generating pointers of a simple format for user data structured to have a simplest format. However, user data structured to have diverse formats has recently been required to meet new multimedia services. In addition, it has been required to take into consideration the bandwidth not used in the procedure of converting data into ATM cells.

It is impossible to efficiently generate pointers capable of supporting user data structured to have diverse formats, only using the functional elements of the conventional technique.

SUMMARY OF THE INVENTION

Therefore, the present invention has been made in view of the above mentioned problems involved with the related art, and an object of the invention is to provide an apparatus for and a method of generating pointers for transfer of structured data in an AAL1, which are capable of calculating composite structure boundaries for diverse user data structured to have diverse formats, without using the counter conventionally used to count user data supported by the conventional technique, thereby meeting the requirement to support those diverse user data.

In accordance with one aspect, the present invention provides an apparatus for generating pointers for transfer of structured data in an asynchronous transfer mode (ATM) adaptation layer Type 1 (AAL1), comprising:

control signal generating means for receiving a sequence number signal and a start signal, thereby generating enable signals and control signals;

next-cycle boundary generating means for generating a next-cycle boundary value, using a pointer value and a "Pointer_" value adapted to store a sequence of ATM cells, the pointer value and the "Pointer_P" value being previously received from pointer calculating means;

modulo calculating means for calculating a modulo(remainder) obtained by dividing the next-cycle boundary value received from the next-cycle boundary generating means by an externally-received block size value;

current-cycle boundary generating means for generating a current-cycle boundary value, using the next-cycle boundary value received from the next-cycle boundary generating means, the modulo received from the modulo calculating means, and the block size value; and the pointer calculating means for generating a pointer value for determination of structure boundaries and a "Pointer_P" value, to be supplied to the next-cycle boundary generating means, based on the current-cycle boundary value received from the current-cycle boundary generating means.

In accordance with another aspect, the present invention provides a method for generating pointers adapted to generate respective structure boundary values of input channels for leased lines in an asynchronous transfer mode (ATM) adaptation layer Type 1 (AAL1) in order to support transfer of structured data in a procedure for converting the input channels into ATM cells, comprising the steps of:

(A) calculating a next-cycle boundary value, based on a pointer value and a "Pointer_P" value adapted to store a sequence of the ATM cells;

(B) calculating a modulo obtained by dividing the next-cycle boundary value calculated at the step (A) by a block size value;

(C) calculating a current-cycle boundary value, based on the next-cycle boundary value calculated at the step (A), the block size value, and the modulo calculated at the step (B); and (D) generating a next pointer value for determination of structure boundaries, and a next "Pointer_P" value for the storage of the ATM cell sequence, based on a range of the current-cycle boundary value calculated at the step (C).

In accordance with another aspect, the present invention provides a computer-readable storage medium stored with a program for executing, in a processor, functions for generating pointers adapted to generate respective structure boundary values of input channels for leased lines in an asynchronous transfer mode (ATM) adaptation layer Type 1 (AAL1) in order to support transfer of structured data in a procedure for converting the input channels into ATM cells, the functions comprising:

a first function for calculating a next-cycle boundary value, based on a pointer value and a "Pointer_P" value adapted to store a sequence of the ATM cells;

a second function for calculating a modulo obtained by dividing the next-cycle boundary value calculated in accordance with the first function by a block size value;

a third function for calculating a current-cycle boundary value, based on the next-cycle boundary value calculated in accordance with the first function, the block size value, and the modulo calculated in accordance with the second function; and a fourth function for generating a next pointer value for determination of structure boundaries, and a next "Pointer_P" value for the storage of the ATM cell sequence, based on a range of the current-cycle boundary value calculated in accordance with the third function.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in detail, with reference to the annexed drawings.

Figure 1:
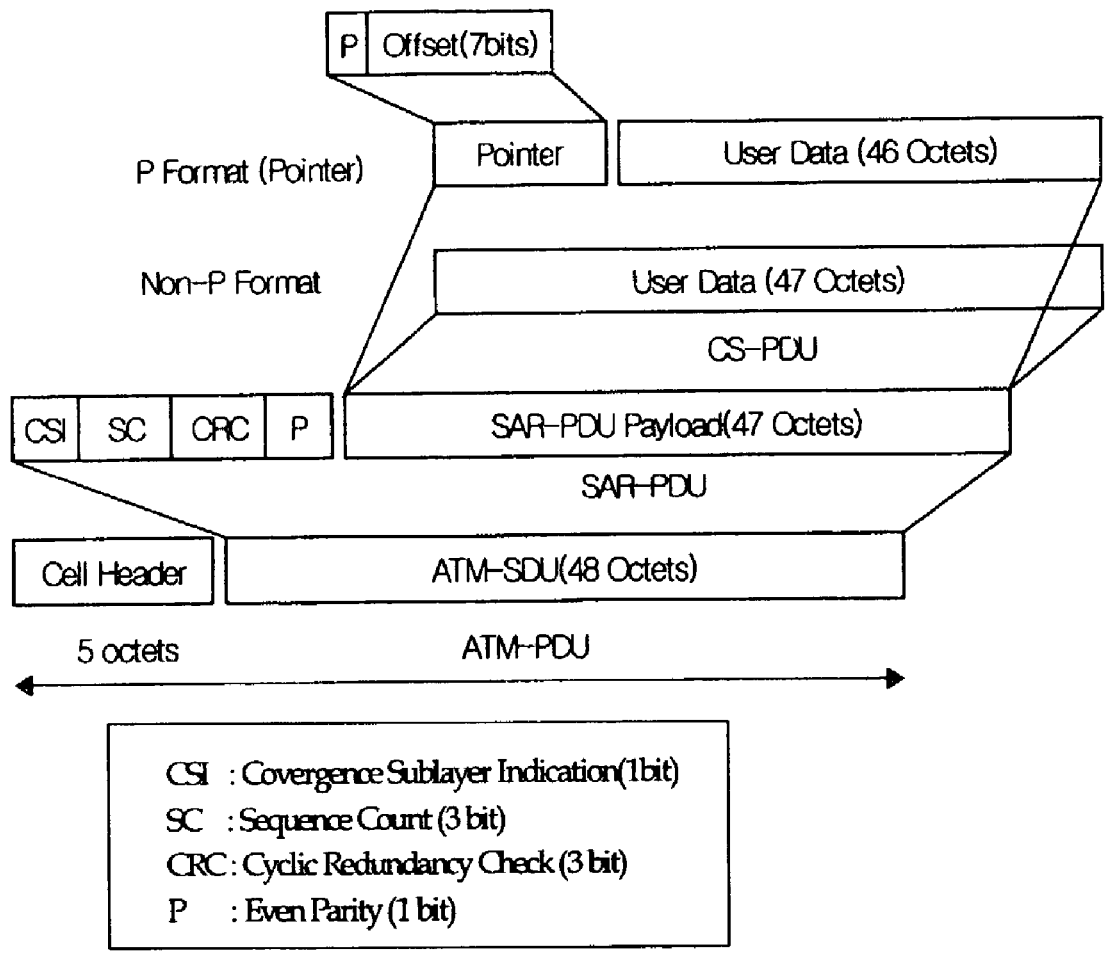
FIG. 1 is a diagram illustrating a data frame format for a general AAL1.

FIG. 1 is a diagram illustrating a frame format for an AAL1. In FIG. 1, "CS-PDU" represents a frame format used in a CS of the AAL1. There are two kinds of CS-PDUs, that is, a P-format type CS-PDU capable of transferring structured user information, and a non-P-format type CS-PDU impossible to transfer any structured information. In accordance with the ITU-T standard for AAL1, the P-format type CS-PDU is used in a structured data transfer (SDT) mode, whereas the non-P-format type CS-PDU is used in an unstructured data transfer (UDT) mode. As a frame format for transfer of data from the CS to the SAR, an SAR-PDU of 48 octets is used. The 48-octet SAR-PDU has a 1-octet SAR-PDU header, and a 47-octet SAR-PDU payload. The SAT-PDU header consists of a 4-bit sequence number, and a 4-bit sequence number protection. The 4-bit sequence number consists of a 1-bit CS indication (CSI), and a 3-bit sequence count, whereas the 4-bit sequence number protection consists of a 3-bit cyclic redundancy check (CRC) value, and a 1-bit even parity for the SAR-PDU header. An 5-octet ATM header is affixed to the 48-octet SAR-PDU to form a 53-octet ATM-PDU. This 53-octet ATM-PDU is used for transfer of data to an ATM layer.

The format of the SAR-PDU payload is classified into a P-format for the SDT mode, and a non-P-format for the UDT mode. In the case of the P-format, the first octet of the SAR-PDU payload is assigned as a pointer for SDT. This pointer octet consists of a most significant bit assigned as a 1-bit even parity for the pointer, and the remaining 7 bits assigned as an offset field of the pointer.

The non-P-format is used only when the sequence count is an odd number, that is, 1, 3, 5, or 7. In accordance with the non-P-format, the CSI bit is assigned with a residual time stamp (RTS) value when a synchronous residual time stamp (SRTS) method is used as a clock synchronization method, while being assigned with a value of "0" when the SRTS method is not used.

The P-format is used for a cell corresponding to a sequence count of 0, 2, 4 or 6. In particular, the P-format is used only when the structure size (=N) is 1 octet or more. In other words, the P-formant is not used when one channel is mapped to one virtual channel connection (VCC). The pointer field used in the P-format is used to determine structure boundaries. The use of this pointer field is carried out in accordance with the following rule. That is, where the P-format is used, the CSI bit of the SAR-PDU header is always assigned with a value of "1". In the case of the P-format, one pointer has to be used for every 8 cells. The pointer has to be inserted into a first possible one of even-number sequence counts. The pointer has a value ranging from 0 to 93 to represent the number of octets present in a structure block within a 93-octet payload (including the 46-byte payload of the cell associated with the current pointer, and the 47-byte payload of the next cell). Where a structure boundary is begun just next to the pointer, this pointer has a value of "0". The pointer value of "93" represents the fact that the end of the structure corresponds to the end of the 93-byte payload. A dummy pointer value of "127" is inserted into a cell having a sequence count of "6" among the 8 cells. The CSI bit of the SAR-PDU header is always "1".

Figure 2:
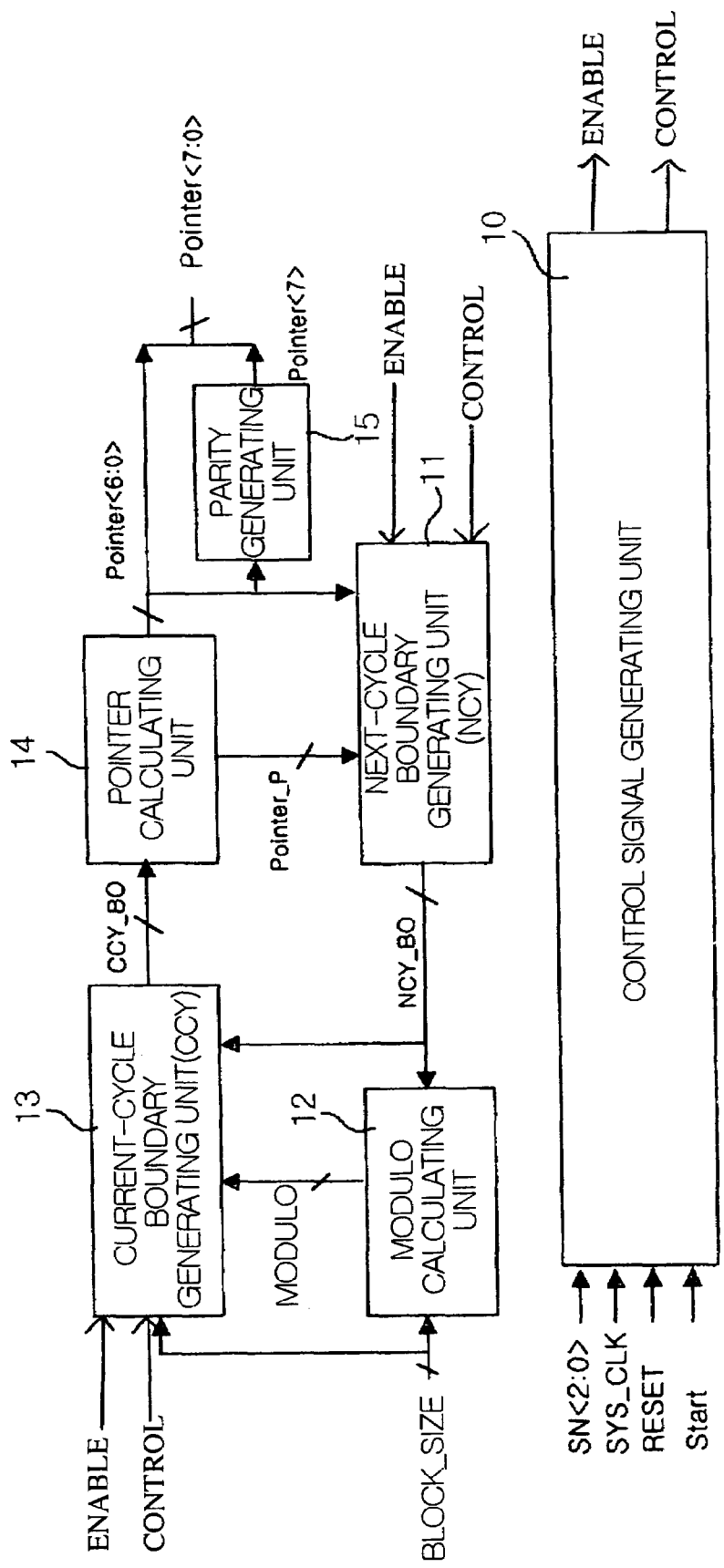
FIG. 2 is a block diagram illustrating a pointer generating apparatus in accordance with the present invention.

FIG. 2 is a block diagram illustrating an apparatus for generating pointers in the SDT mode of the AAL1 in accordance with the present invention. In FIG. 10, the reference numeral "10" denotes a control signal generating unit, "11" a next-cycle boundary generating unit, "12" a modulo calculating unit, "13" a current-cycle boundary generating unit, and "14" a pointer calculating unit, and "15" a parity generating unit.

In accordance with an embodiment of the present invention, the higher layer uses an E1 or T1 TDM trunk, while using a start signal to synchronize frames with the sequence number (SN) outputted from an E1 or T1 line matching unit in an AAL1 device. The higher layer also receives a 10-bit block size signal Block_size from a programmable register included in a processor connecting unit in order to generate data structure boundary information, thereby programming the size of structured data.

Each of pointers generated in accordance with the present invention consists of 8 bits, that is, a 7-bit pointer offset field, and a 1-bit parity field. The entire block is initialized by a reset signal. In order to set an appropriate block size signal Block_size, a desired structure data size is programmed in a register via a processor connecting unit in the AAL1 by a processor.

The control signal generating unit 10 generates enable signals and control signals for respective functional units shown in FIG. 2 when a start signal is generated within one system clock period after an initialization of the control signal generating unit 10. That is, the control signal generating unit 10 generates an enable signal for the next-cycle boundary (NCY) generating unit 11 at a clock following triggering of the start signal. The control signal generating unit 10 also generates an enable signal for the current-cycle boundary (CCY) generating unit 13 after a maximum of 10 clock periods. The reason why the CCY enable signal is generated after a maximum of 10 clock periods is that a maximum of 10 clock periods are taken to complete a modulo calculation required to calculate the current-cycle boundary value CCY_BO.

Where the pointer has a value of "127", and the value "Pointer_P" for storing the sequence of ATM cells is 6, the next-cycle boundary generating unit 11 outputs, as a next-cycle boundary value NCY_BO, the value obtained by adding a value of "375" to a previously-stored next-cycle boundary value because the current cycle has no next-cycle boundary in this case. On the other hand, where the pointer has a value of "93", and the value "Pointer_P" is 6, the next-cycle boundary generating unit 11 outputs a value of "0" as the next-cycle boundary value NCY_BO because the current boundary corresponds to the next boundary in this case. In other cases, the next-cycle boundary generating unit 11 outputs, as its next-cycle boundary value NCY_BO, a value of "375—((Pointer_P×47)+Pointer)".

The modulo calculating unit 12 calculates a modulo(the remainder) obtained by dividing the next-cycle boundary value NCY_BO, required to calculate the current-cycle boundary value CCY_BO, by the block size value Block_size, and sends the calculated modulo(the remainder) to the current-cycle boundary generating unit 13.

The current-cycle boundary generating unit 13 outputs a value of "0" as its current-cycle boundary value CCY_BO when the next-cycle boundary value NCY_BO from the next-cycle boundary generating unit 11 applied to the current-cycle boundary generating unit 13 is 0, or identical to the block size value Block_size, because the current-cycle boundary value CCY_BO corresponds to the block size value Block_size in this case. Under other conditions, the current-cycle boundary generating unit 13 outputs, as its current-cycle boundary value CCY_BO, a value obtained by deducting, from the block size value Block_size, the value supplied from the modulo calculating unit 12 (that is, the modulo obtained by dividing the next-cycle boundary value NCY_BO by the block size value Block_size).

The parity generating unit 15 generates an even parity for a 7-bit pointer value supplied from the pointer calculating unit 14. The even parity is outputted as the most significant bit of the pointer.

Figure 3:
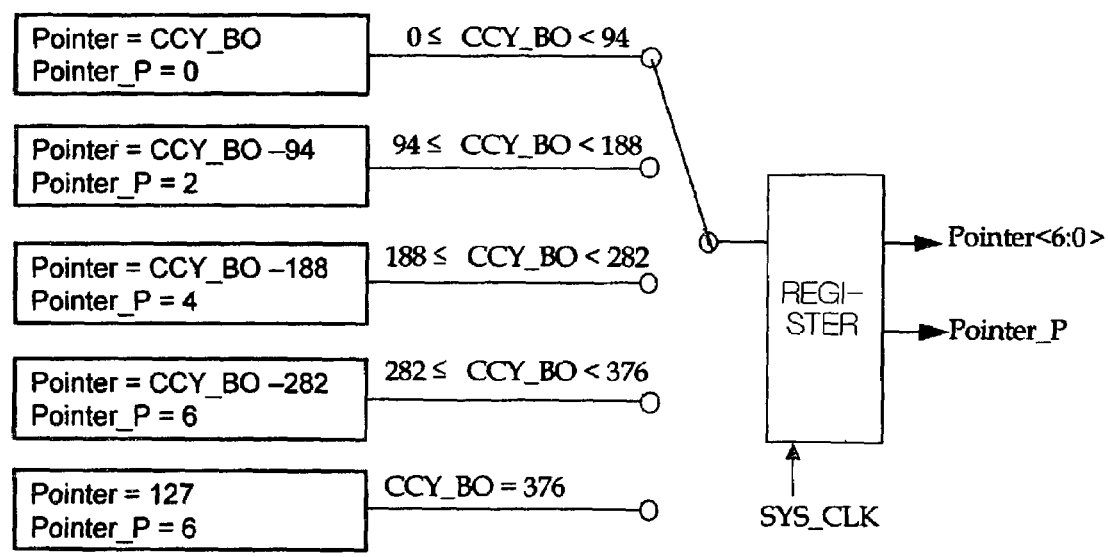
FIG. 3 is a block diagram illustrating the operation of a pointer calculating unit according to the present invention.

FIG. 3 is a block diagram illustrating the operation of the pointer calculating unit according to the present invention. The pointer calculating unit 14 calculates the value of a pointer for structure boundaries, based on the current-cycle boundary value CCY_BO, as described above, when the pointer calculating unit enable signal is activated for one clock period. That is, the pointer calculating unit 14 calculates a 7-bit pointer value based on the range of the current-cycle boundary value CCY_BO, in response to an associated enable signal from the control signal generating unit 10. The pointer calculating unit 14 generates the 7-bit pointer value by deducting, from the current-cycle boundary value CCY_BO, a value corresponding to "0" or a multiple of 94. The pointer calculating unit 14 also generates the value "Pointer_P" for storing the sequence of ATM cells. The pointer value represents positions of structure boundaries among 8 cells. Accordingly, the number of octets in the 8 cells including pointers is 376 (47*8=376). The operation of the pointer calculating unit will be described in more detail, with reference to FIG. 3.

In response to an activation of the pointer calculating unit enable signal by the control signal generating unit 10, the pointer calculating unit 14 assigns the current-cycle boundary value CCY_BO as its pointer value while assigning a value of "0" as its "Pointer_P" value when the current-cycle boundary value CCY_BO received from the current-cycle boundary generating unit 13 is within a range of 0 to 93, stores those values, and subsequently outputs the stored values. When the current-cycle boundary value CCY_BO is within a range of 94 to 187, the pointer calculating unit 14 assigns, as its pointer value, a value obtained by deducting a value of "94" from the current-cycle boundary value CCY_BO while assigning a value of "2" as its "Pointer_P" value, stores those values, and subsequently outputs the stored values. Where the current-cycle boundary value CCY_BO is within a range of 188 to 281, the pointer calculating unit 14 assigns, as its pointer value, a value obtained by deducting a value of "188" from the current-cycle boundary value CCY_BO while assigning a value of "4" as its "Pointer_P" value, stores those values, and subsequently outputs the stored values. When the current-cycle boundary value CCY_BO is within a range of 281 to 375, the pointer calculating unit 14 assigns, as its pointer value, a value obtained by deducting a value of "282" from the current-cycle boundary value CCY_BO while assigning a value of "6" as its "Pointer_P" value, stores those values, and subsequently outputs the stored values. Where the current-cycle boundary value CCY_BO is 376 representing the fact that there is no structur boundary in the current cycle, the pointer calculating unit 14 assigns a value of "127 as its pointer value while assigning a value of "6" as its "Pointer_P" value, stores those values, and subsequently outputs the stored values.

Figure 4A:
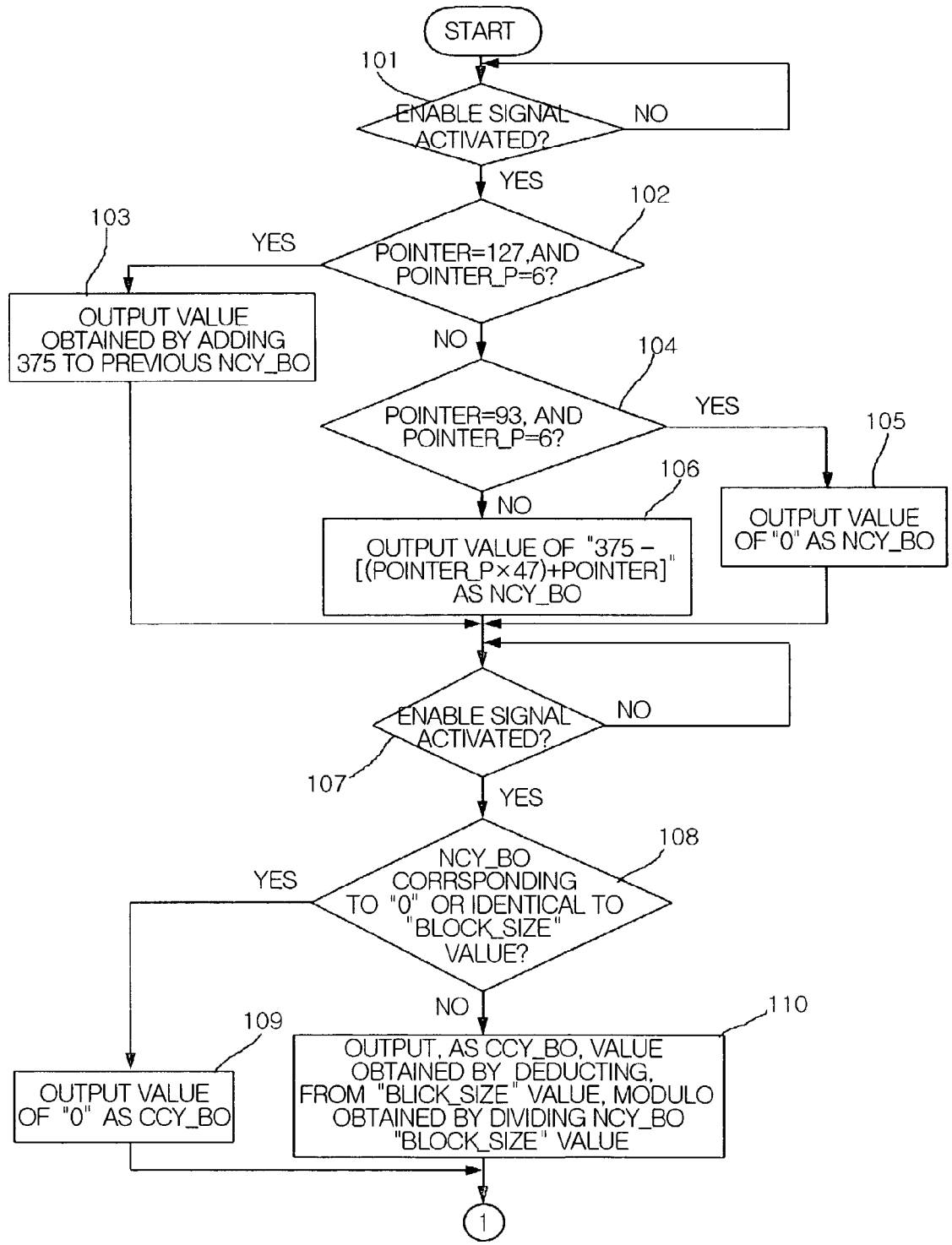
FIGS. 4*a* and 4*b* are flow charts illustrating a pointer generating method according to the present invention, respectively.
Figure 4B:
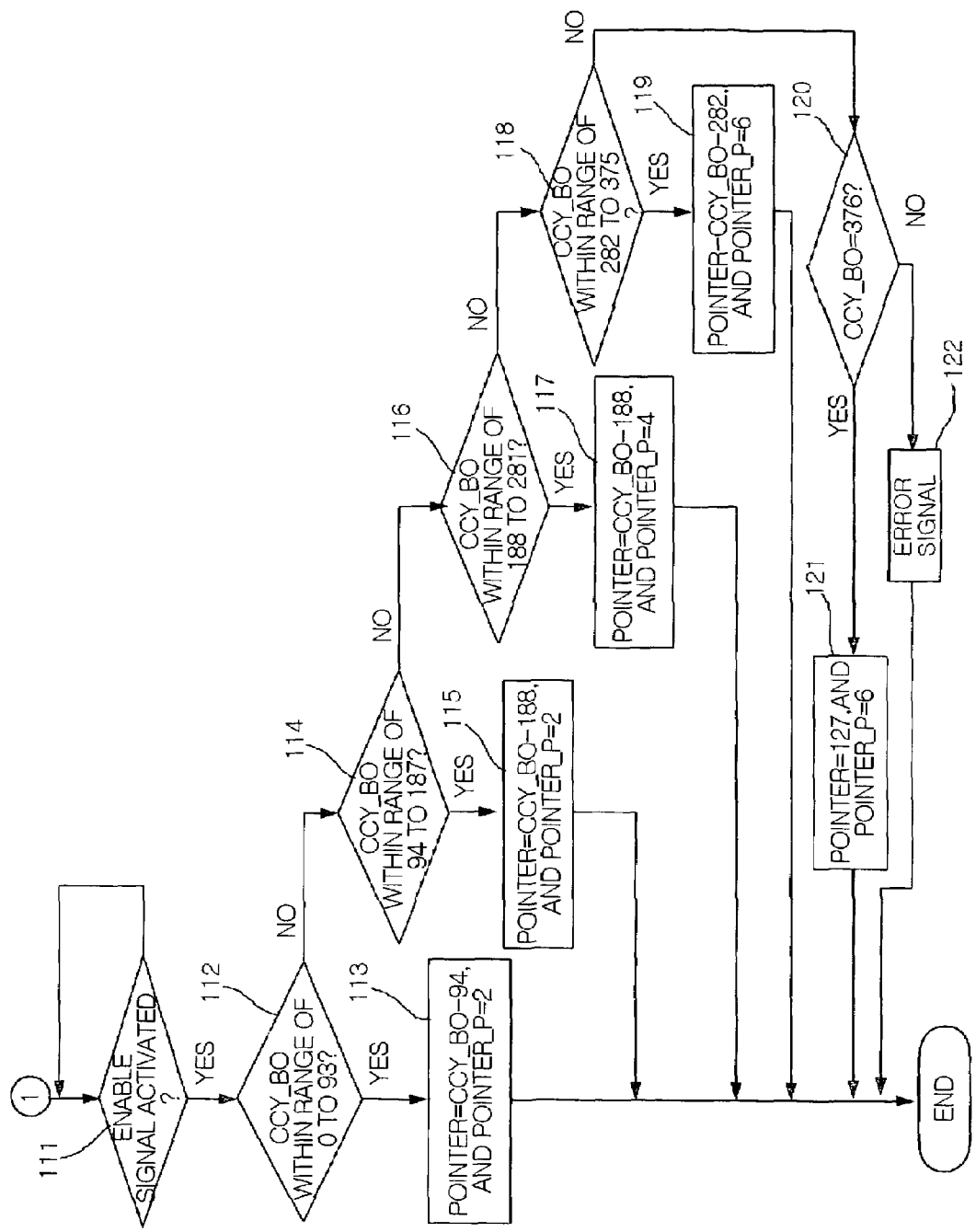

FIGS. 4a and 4b are flow charts illustrating a pointer generating method according to the present invention, respectively.

When the enable signal for generation of a next-cycle boundary value is activated (Step 101), a pointer value and a "Pointer_P" value are generated. Where the pointer value is 127, and the "Pointer_P" value is 6 (Step 102), the value obtained by adding a value of "375" to the previously-stored next-cycle boundary value NCY_BO is outputted as a next-cycle boundary value NCY_BO because there is no next-cycle boundary in the current cycle (Step 103). Where the pointer value is 93, and the "Pointer_P" value is 6 (Step 104), the value of "0" is outputted as the next-cycle boundary value NCY_BO because the current boundary corresponds to the next boundary in this case (Step 105). Where the pointer value has a value other than the above described values, and the "Pointer_P" value has a value other than the above described values, the value of "375−((Pointer_P×47)+Pointer" is outputted as the next-cycle boundary value NCY_BO (Step 106).

When the enable signal for generation of a current-cycle boundary value is activated (Step 107), it is determined whether or not the next-cycle boundary value NCY_BO corresponds to either a value of "0" or the block size value Block_size (Stpe 108). Where the next-cycle boundary value NCY_BO corresponds to the value of "0" or the block size value Block_size, the current-cycle boundary value corresponds to the block size value Block_size. In this case, therefore, a value of "0" is outputted as the current-cycle boundary value CCY_BO (Step 109). On the other hand, where the next-cycle boundary value NCY_BO has a value other than the above described values, a value obtained by deducting, from the block size value Block_size, a modulo obtained by dividing the next-cycle boundary value NCY_BO by the block size value Block_size is outputted as the current-cycle boundary value CCY_BO (Step 110).

When the pointer calculating unit enable signal is subsequently activated, a pointer value and a "Pointer_P" value are outputted. When the current-cycle boundary value CCY_BO is within a range of 0 to 93 (Step 112), it is assigned as the pointer value, and a value of "0" is assigned as the "Pointer_P" value (Step 113). The assigned values are subsequently outputted. When the current-cycle boundary value CCY_BO is within a range of 94 to 187 (Step 114), a value obtained by deducting a value of "94" from the current-cycle boundary value CCY_BO is assigned as the pointer value, and a value of "2" is assigned as the "Pointer_P" value (Step 115). These values are subsequently outputted. Where the current-cycle boundary value CCY_BO is within a range of 188 to 281 (Step 116), a value obtained by deducting a value of "188" from the current-cycle boundary value CCY_BO is assigned as the pointer value, and a value of "4" is assigned as the "Pointer_P" value (Step 117). These values are subsequently outputted. When the current-cycle boundary value CCY_BO is within a range of 281 to 375 (Step 118), a value obtained by deducting a value of "282" from the current-cycle boundary value CCY_BO is assigned as the pointer value, and a value of "6" is assigned as the "Pointer_P" value (Step 119). The assigned values are subsequently outputted. On the other hand, where the current-cycle boundary value CCY_BO is 376 representing the fact that there is no structure boundary in the current cycle (Step 120), a value of "127 is assigned as the pointer value, and a value of "6" is assigned as the "Pointer_P" value (Step 121). The assigned values are subsequently outputted. Where the current-cycle boundary value CCY_BO does not correspond to even the value of "376", it is determined that there are errors. In this case, an error signal is outputted (Step 122).

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, in accordance with the present invention, information about the structure of user data received from a higher layer, supported by Recommendation I363.1 of the ITU-T, is generated using a sequence number, and then transferred, thereby making it possible to achieve transfer of structured data from an N-ISDN channel to an ATM network while achieving a reduction in ATM bandwidth.

What is claimed is:

1. An apparatus for generating pointers for transfer of structured data in an asynchronous transfer mode (ATM) adaptation layer Type 1 (AAL1), comprising:
   a next-cycle boundary generating means for generating a next-cycle boundary value, using a pointer value and a "Pointer_P" value in order to store a sequence of ATM cells;
   a modulo calculating means for calculating a modulo obtained by dividing the next-cycle boundary value received from the next-cycle boundary generating means by an externally-received block size value;
   a current-cycle boundary generating means for generating a current-cycle boundary value, using the next-cycle boundary value received from the next-cycle boundary generating means, the modulo received from the modulo calculating means, and the block size value;
   a pointer calculating means for generating a pointer value for determination of structure boundaries and a "Pointer_P" value, to be supplied to the next-cycle boundary generating means, based on the current-cycle boundary value received from the current-cycle boundary generating means; and
   a control signal generating means for receiving a sequence number signal and a start signal and generating enable signals and control signals to be provided to the next-cycle boundary generating means and the current-cycle boundary generating means.

2. The apparatus according to claim 1, further comprising: parity generating means for generating an even parity of the pointer value generated from the pointer calculating means, and outputting the even parity as a most significant bit of the generated pointer value.

3. The apparatus according to claim 2, wherein the next-cycle boundary generating means outputs, as the next-cycle boundary value, a value obtained by adding a value of "375" to a previously-stored next-cycle boundary value when the pointer value received from the pointer calculating means is 127, and the "Pointer_P" value received from the pointer calculating means is 6, because there is no next-cycle boundary in a current cycle, while outputting, as the next-cycle boundary value, a value of "0" when the received pointer value is 93, and the received "Pointer_P" value is 6, because a current boundary corresponds to a next boundary, and outputting, as the next-cycle boundary value, a value of "375−(Pointer_P.times.47)+Pointer" when the pointer value and the "Pointer_P" value have other values, respectively.

4. The apparatus according to claim 3, wherein the current-cycle boundary generating means outputs, as the current-cycle boundary value, a value of "0" when the next-cycle boundary value is 0, or identical to the block size value, because the current-cycle boundary value corresponds to the block size value, while outputting, as the current-cycle boundary value, a value obtained by deducting, from the block size value, the modulo received from the modulo calculating means, under other conditions.

5. The apparatus according to claim 4, wherein the pointer calculating means: assigns, as the pointer value to be generated therefrom, the current-cycle boundary value while assigning, as the "Pointer_P" value to be generated therefrom, a value of "0" when the current-cycle boundary value is within a range of 0 to 93; assigns, as the pointer value to be generated therefrom, a value obtained by deducting a value of "94" from the current-cycle boundary value while assigning, as the "Pointer_P" value to be generated therefrom, a value of "2" when the current-cycle boundary value is within a range of 94 to 187; assigns, as the pointer value to be generated therefrom, a value obtained by deducting a value of "188" from the current-cycle boundary value while assigning, as the "Pointer_P" value to be generated therefrom, a value of "4" when the current-cycle boundary value is within a range of 188 to 281; assigns, as the pointer value to be generated therefrom, a value obtained by deducting a value of "282" from the current-cycle boundary value while assigning, as the "Pointer_P" value to be generated therefrom, a value of "6" when the current-cycle boundary value is within a range of 281 to 375; and assigns, as the pointer value to be generated therefrom, a value of "127 while assigning, as the "Pointer_P" value to be generated therefrom, a value of "6" when the current-cycle boundary value is 376 because there is no structure boundary in the current cycle.

6. The apparatus according to claim 1, wherein the next-cycle boundary generating means outputs, as the next-cycle boundary value, a value obtained by adding a value of "375" to a previously-stored next-cycle boundary value when the pointer value received from the pointer calculating means is 127, and the "Pointer_P" value received from the pointer calculating means is 6, because there is no next-cycle boundary in a current cycle, while outputting, as the next-cycle boundary value, a value of "0" when the received pointer value is 93, and the received "Pointer_P" value is 6, because a current boundary corresponds to a next boundary, and outputting, as the next-cycle boundary value, a value of "375−(Pointer_P.times.47)+Pointer" when the pointer value and the "Pointer_P" value have other values, respectively.

7. The apparatus according to claim 6, wherein the current-cycle boundary generating means outputs, as the current-cycle boundary value, a value of "0" when the next-cycle boundary value is 0, or identical to the block size value, because the current-cycle boundary value corresponds to the block size value, while outputting, as the current-cycle boundary value, a value obtained by deducting, from the block size value, the module received from the modulo calculating means, under other conditions.

8. The apparatus according to claim 7, wherein the pointer calculating means: assigns, as the pointer value to be generated therefrom, the current-cycle boundary value while assigning, as the "Pointer_P" value to be generated therefrom, a value of "0" when the current-cycle boundary value is within a range of 0 to 93; assigns, as the pointer value to be generated therefrom, a value obtained by deducting a value of "94" from the current-cycle boundary value while assigning, as the "Pointer_P" value to be generated therefrom, a value of "2" when the current-cycle boundary value is within a range of 94 to 187; assigns, as the pointer value to be generated therefrom, a value obtained by deducting a value of "188" from the current-cycle boundary value while assigning, as the "Pointer_P" value to be generated therefrom, a value of "4" when the current-cycle boundary value is within a range of 188 to 281; assigns, as the pointer value to be generated therefrom, a value obtained by deducting a value of "282" from the current-cycle boundary value while assigning, as the "Pointer_P" value to be generated therefrom, a value of "6" when the current-cycle boundary value is within a range of 281 to 375; and assigns, as the pointer value to be generated therefrom, a value of "127 while assigning, as the "Pointer_P" value to be generated therefrom, a value of "6" when the current-cycle boundary value is 376 because there is no structure boundary in the current cycle.

9. A method for generating pointers in order to generate respective structure boundary values of input channels for leased lines in an asynchronous transfer mode (ATM) adaptation layer Type 1 (AAL1) in order to support transfer of structured data in a procedure for converting the input channels into ATM cells, comprising the steps of:

A) calculating a next-cycle boundary value, based on a pointer value and a "Pointer_P" value adapted to store a sequence of the ATM cells;

B) calculating a modulo obtained by dividing the next-cycle boundary value calculated at the step A) by a block size value;

C) calculating a current-cycle boundary value, based on the next-cycle boundary value calculated at the step A), the block size value, and the modulo calculated at the step B); and D) generating a next pointer value for determination of structure boundaries, and a next "Pointer_P" value for the storage of the ATM cell sequence, based on a range of the current-cycle boundary value calculated at the step C).

10. The method according to claim 9, wherein the step A) comprises the steps of:

A-1) outputting, as the next-cycle boundary value, a value obtained by adding a value of "375" to a previously-stored next-cycle boundary value when the pointer value is 127, and the "Pointer_P" value is 6, because there is no next-cycle boundary in a current cycle;

A-2) outputting, as the next-cycle boundary value, a value of "0" when the pointer value is 93, and the "Pointer_P" value is 6, because a current boundary corresponds to a next boundary; and A-3) outputting, as the next-cycle boundary value, a value of "375(Pointer_P.times.47)+Pointer" when the pointer value and the "Pointer_P" value have other values, respectively.

11. The method according to claim 10, wherein the step C) comprises the steps of:

C-1) outputting, as the current-cycle boundary value, a value of "0" when the next-cycle boundary value is 0, or identical to the block size value, because the current-cycle boundary value corresponds to the block size value; and C-2) outputting, as the current-cycle boundary value, a value obtained by deducting, from the block size value, the modulo calculated at the step B), under other conditions.

12. The method according to claim 11, wherein the step D) comprises the steps of:

D-1) assigning; as the next pointer value, the current-cycle boundary value while assigning, as the next "Pointer_P" value, a value of "0" when the current-cycle boundary value is within a range of 0 to 93;

D-2) assigning, as the next pointer value, a value obtained by deducting a value of "94" from the current-cycle boundary value while assigning, as the next "Pointer_P" value, a value of "2" when the current-cycle boundary value is within a range of 94 to 187;

D-3) assigning, as the next pointer value, a value obtained by deducting a value of "188" from the current-cycle boundary value while assigning, as the next "Pointer_P" value, a value of "4" when the current-cycle boundary value is within a range of 188 to 281;

D-4) assigning, as the next pointer value, a value obtained by deducting a value of "282" from the current-cycle boundary value while assigning, as the next "Pointer_P" value, a value of "6" when the current-cycle boundary value is within a range of 281 to 375; and D-5) assigning, as the next pointer value, a value of "127 while assigning, as the next "Pointer_P" value, a value of "6" when the current-cycle boundary value is 376 because there is no structure boundary in the current cycle.

13. A computer-readable storage medium stored with a program for executing, in a processor, functions for generating pointers in order to generate respective structure boundary values of input channels for leased lines in an asynchronous transfer mode (ATM) adaptation layer Type 1 (AAL1) in order to support transfer of structured data in a procedure for converting the input channels into ATM cells, the functions comprising:

a first function for calculating a next-cycle boundary value, based on a pointer value and a "Pointer_P" value adapted to store a sequence of the ATM cells;

a second function for calculating a modulo obtained by dividing the next-cycle boundary value calculated in accordance with the first function by a block size value;

a third function for calculating a current-cycle boundary value, based on the next-cycle boundary value calculated in accordance with the first function, the block size value, and the modulo calculated in accordance with the second function; and a fourth function for generating a next pointer value for determination of structure boundaries, and a next "Pointer_P" value for the storage of the ATM cell sequence, based on a range of the current-cycle boundary value calculated in accordance with the third function.

* * * * *